Aug. 31, 1926.
H. A. GUSTAFSON
1,597,681
MACHINE FOR MAKING PAPER BOXES
Filed August 8, 1923     16 Sheets-Sheet 1
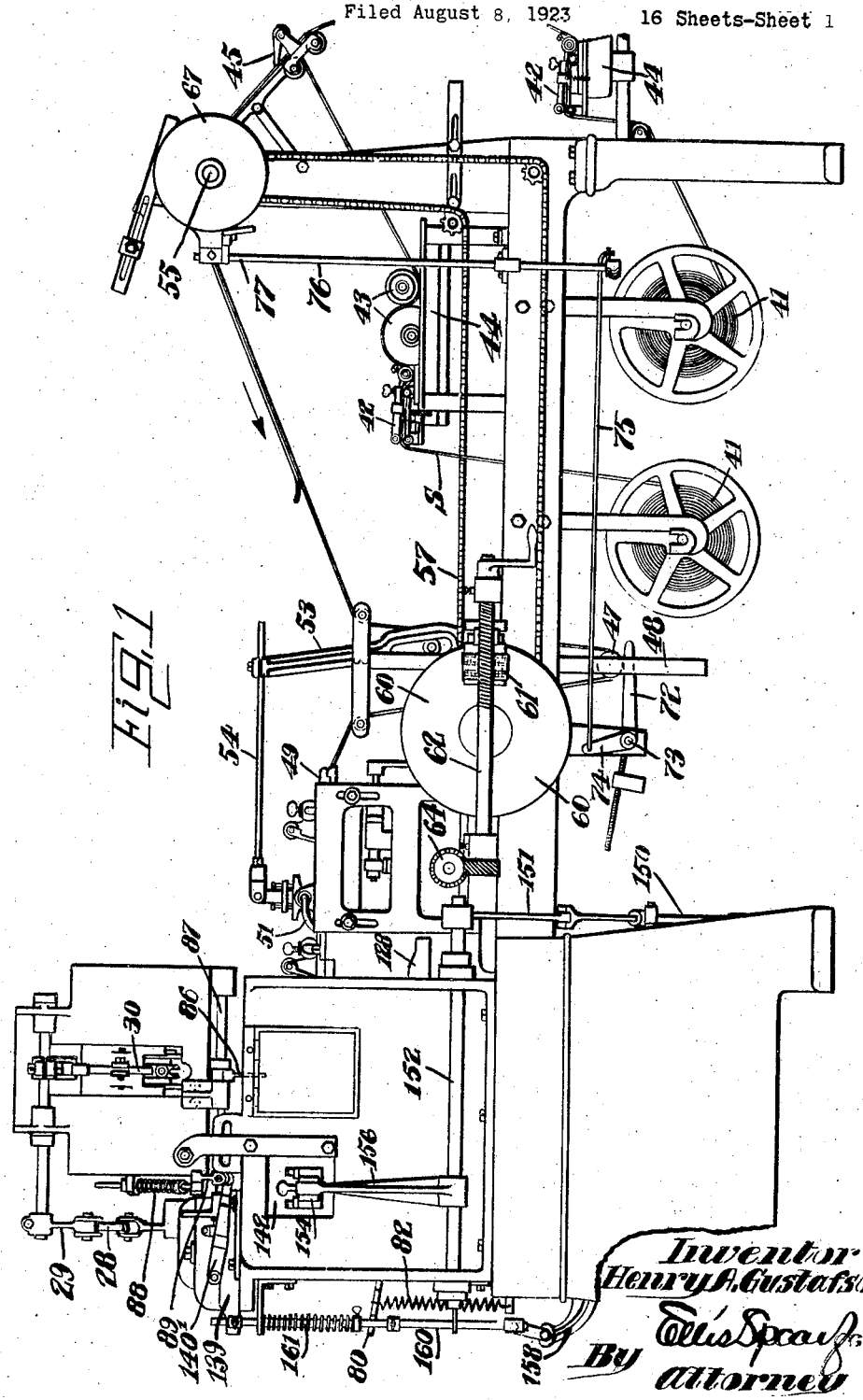
Inventor
Henry A. Gustafson
By Ellis Spear
Attorney

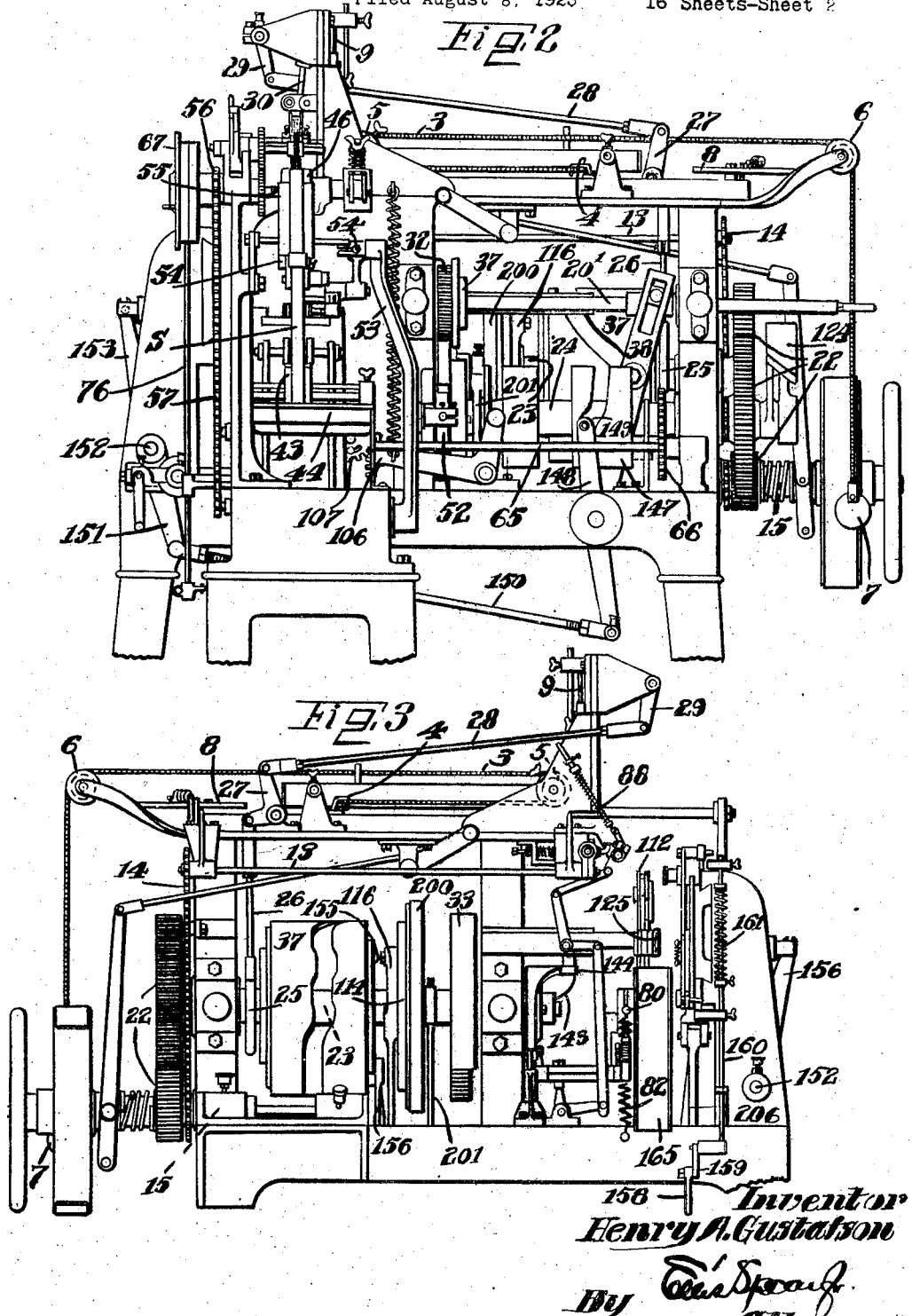

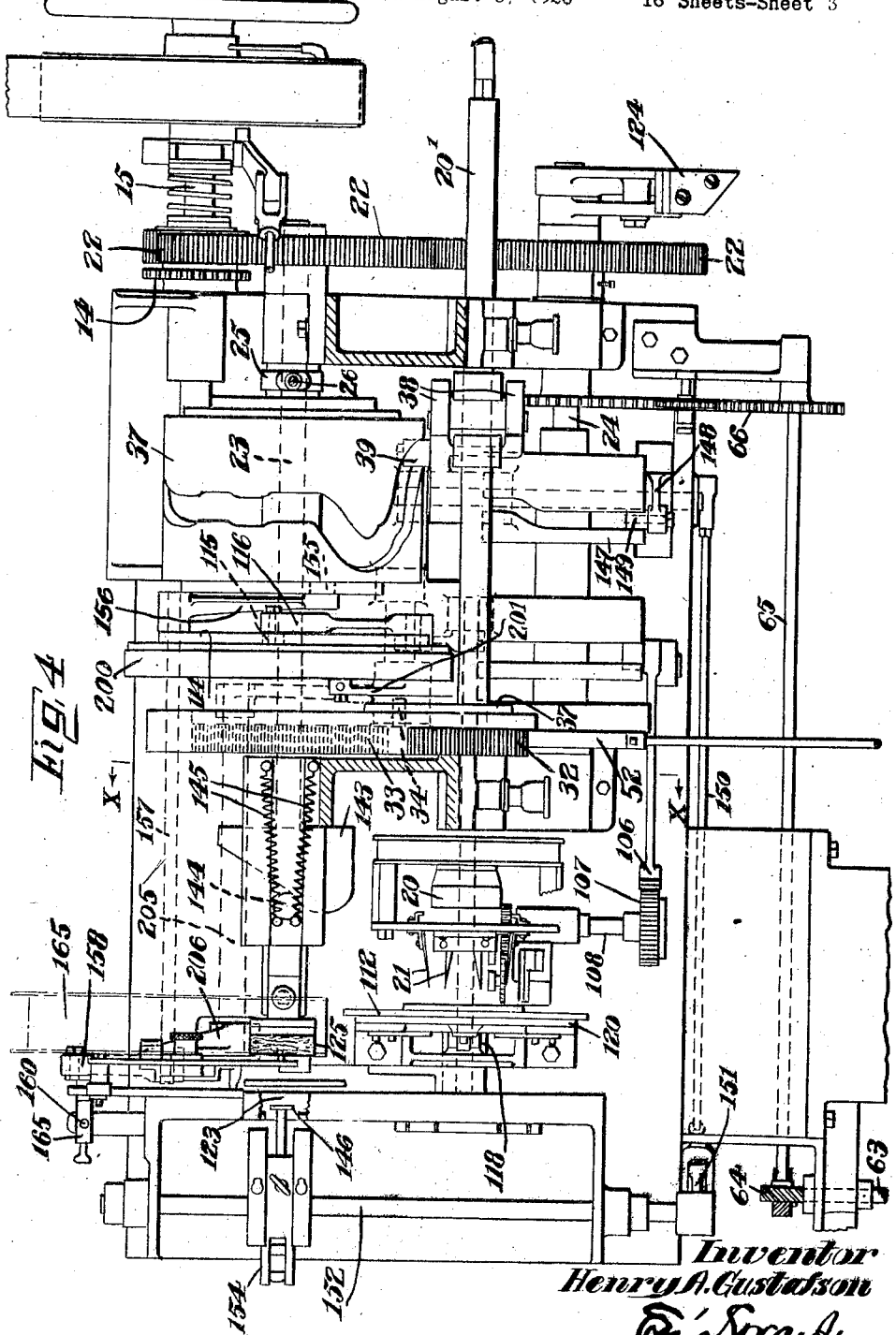

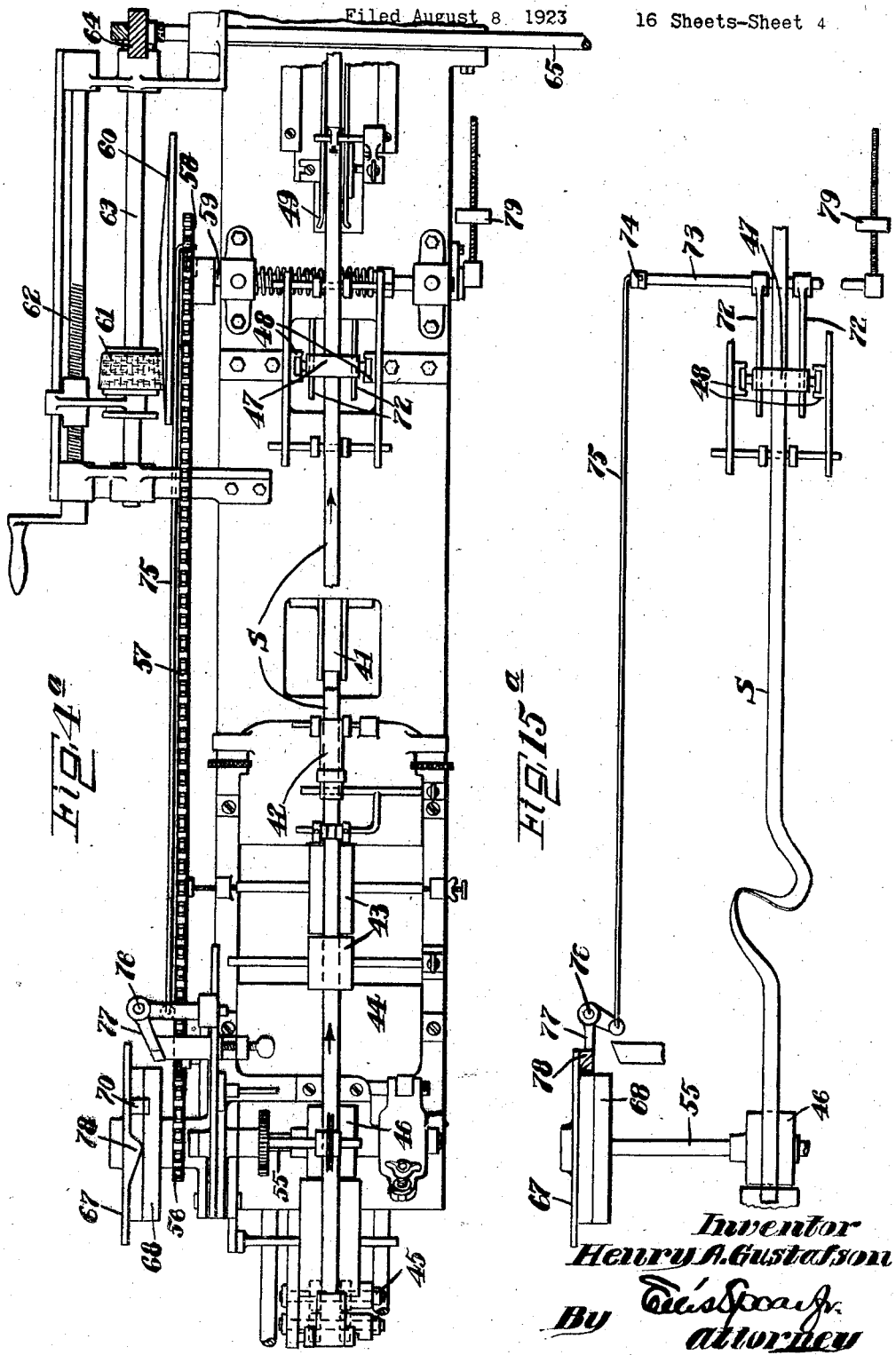

Aug. 31, 1926.   H. A. GUSTAFSON   1,597,681
MACHINE FOR MAKING PAPER BOXES
Filed August 8, 1923   16 Sheets-Sheet 5
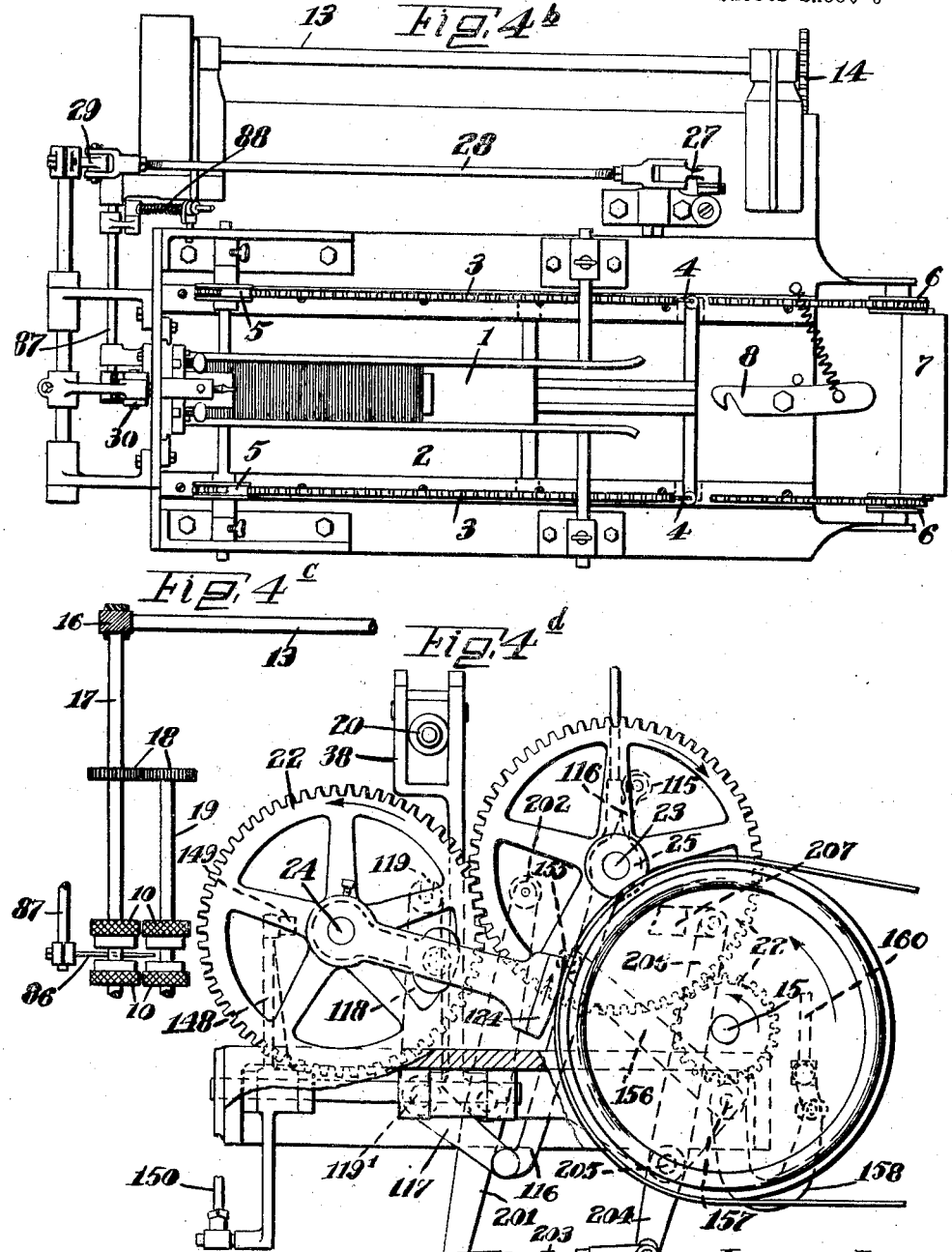
Inventor
Henry A. Gustafson
By
Attorney

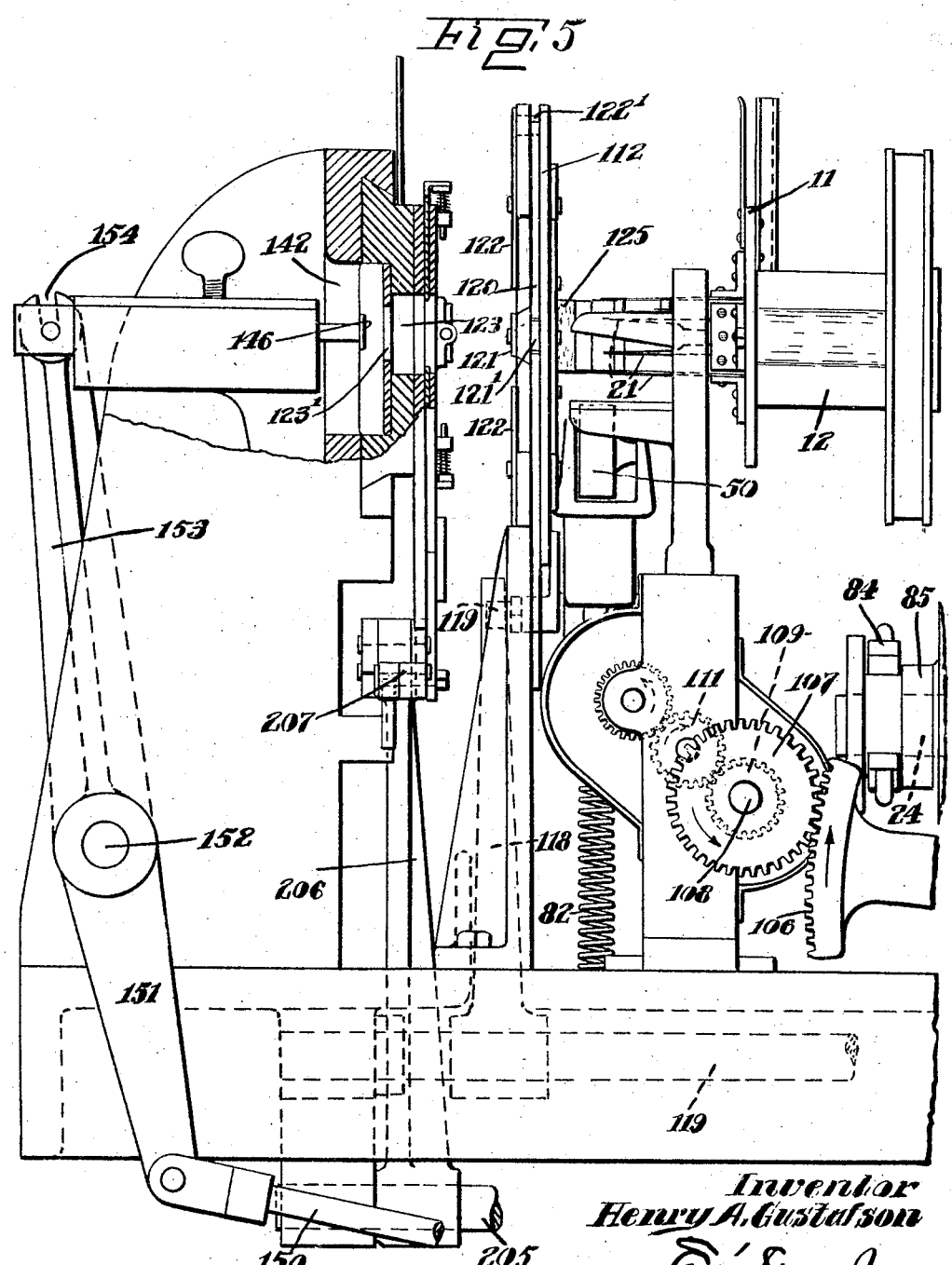

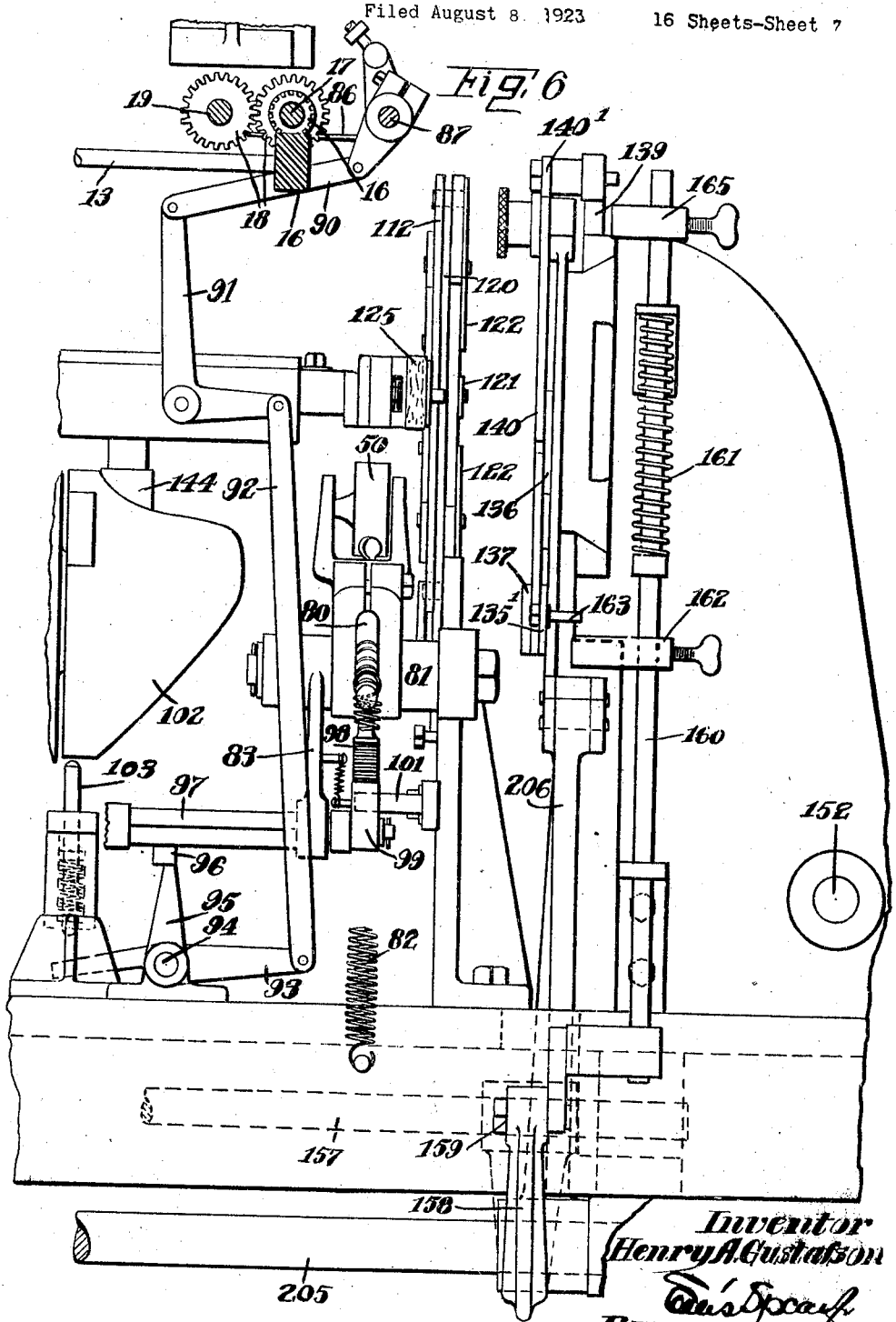

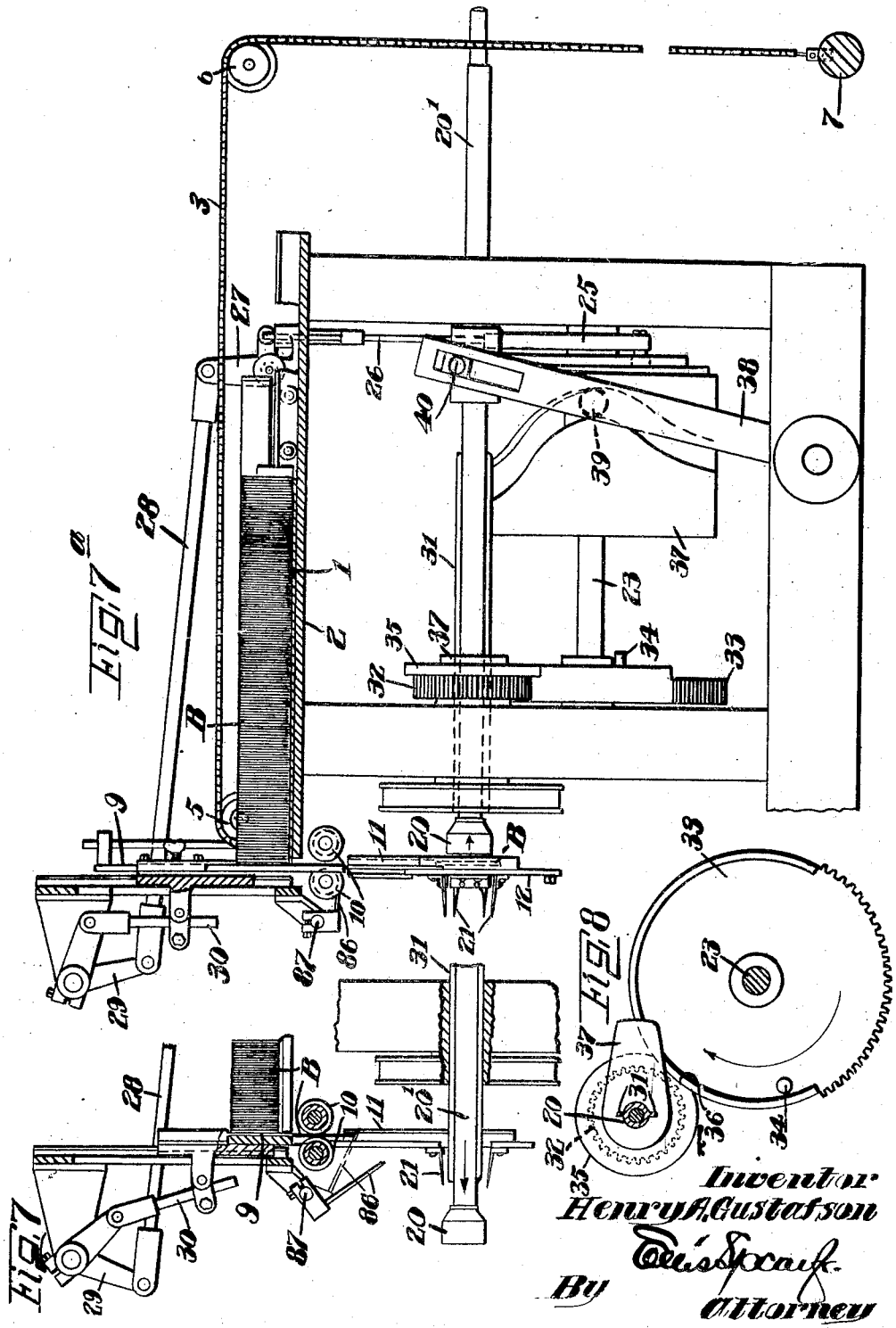

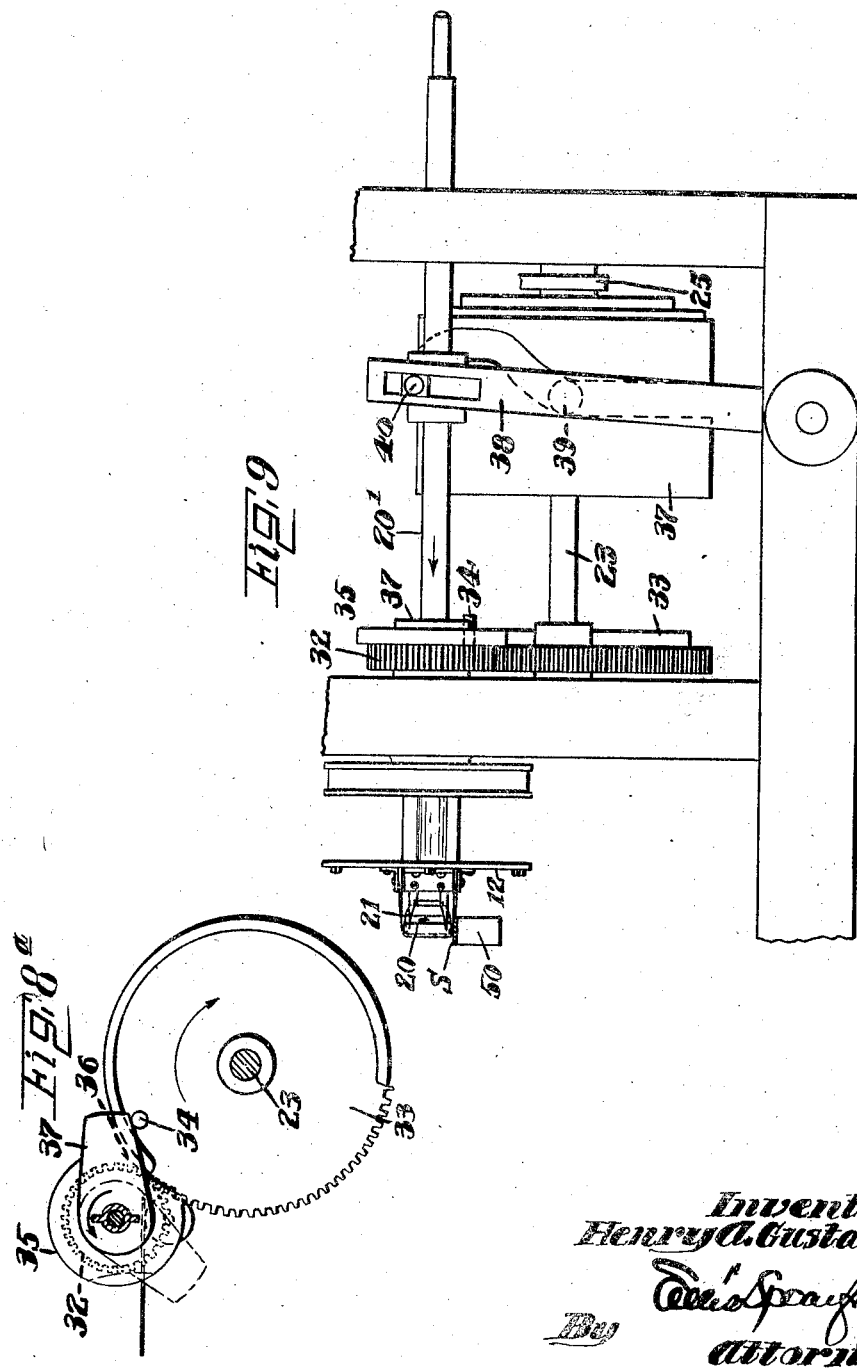

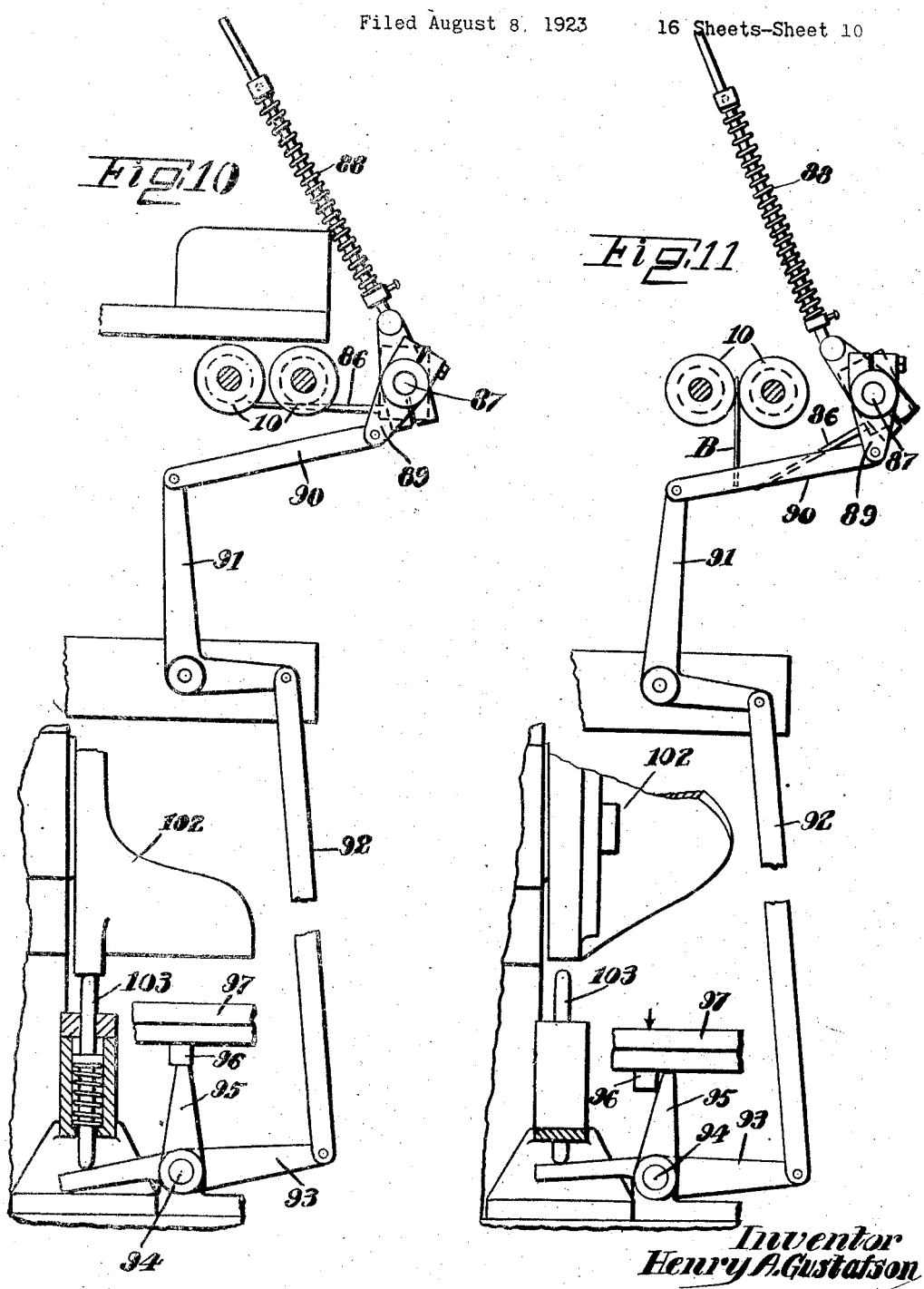

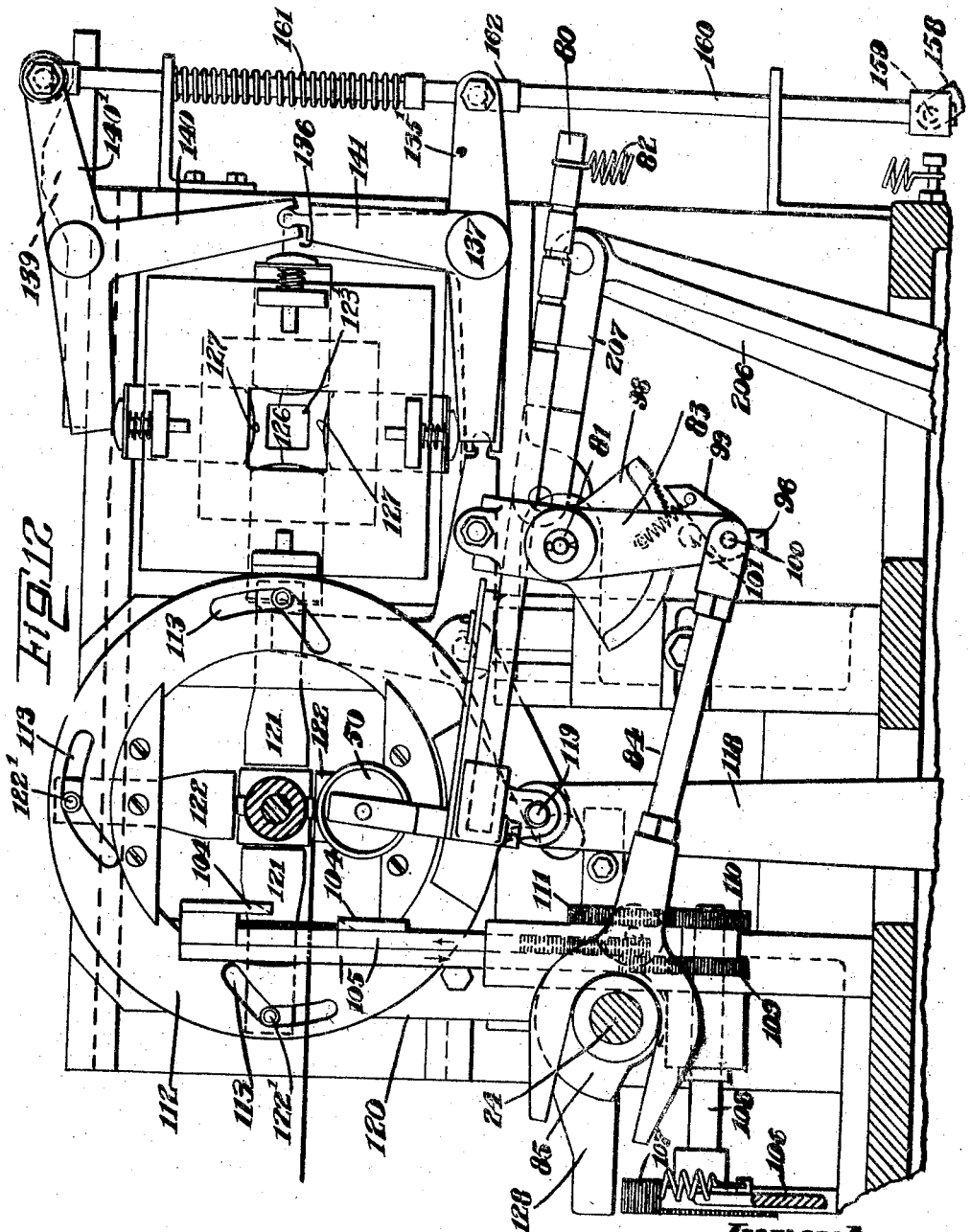

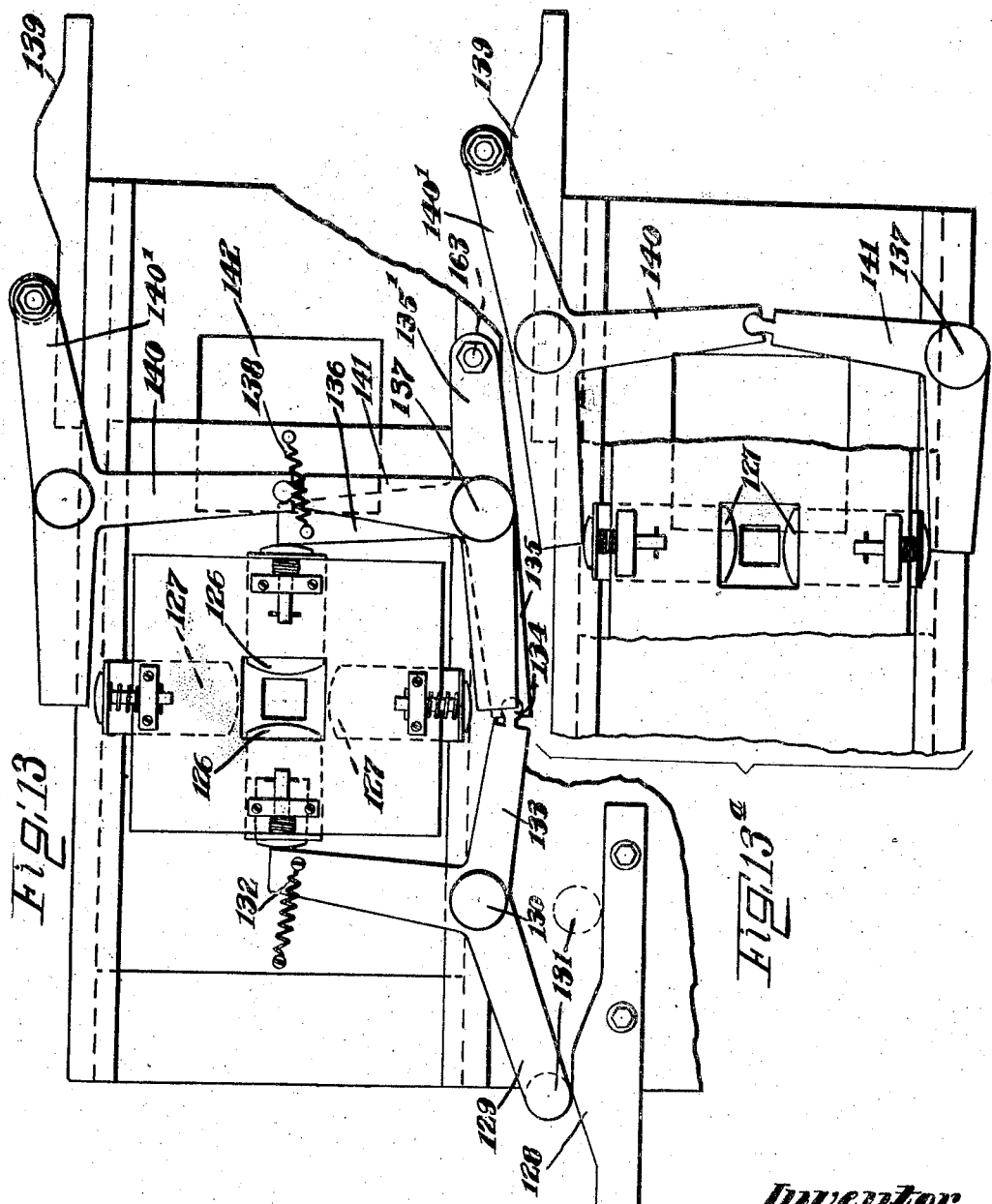

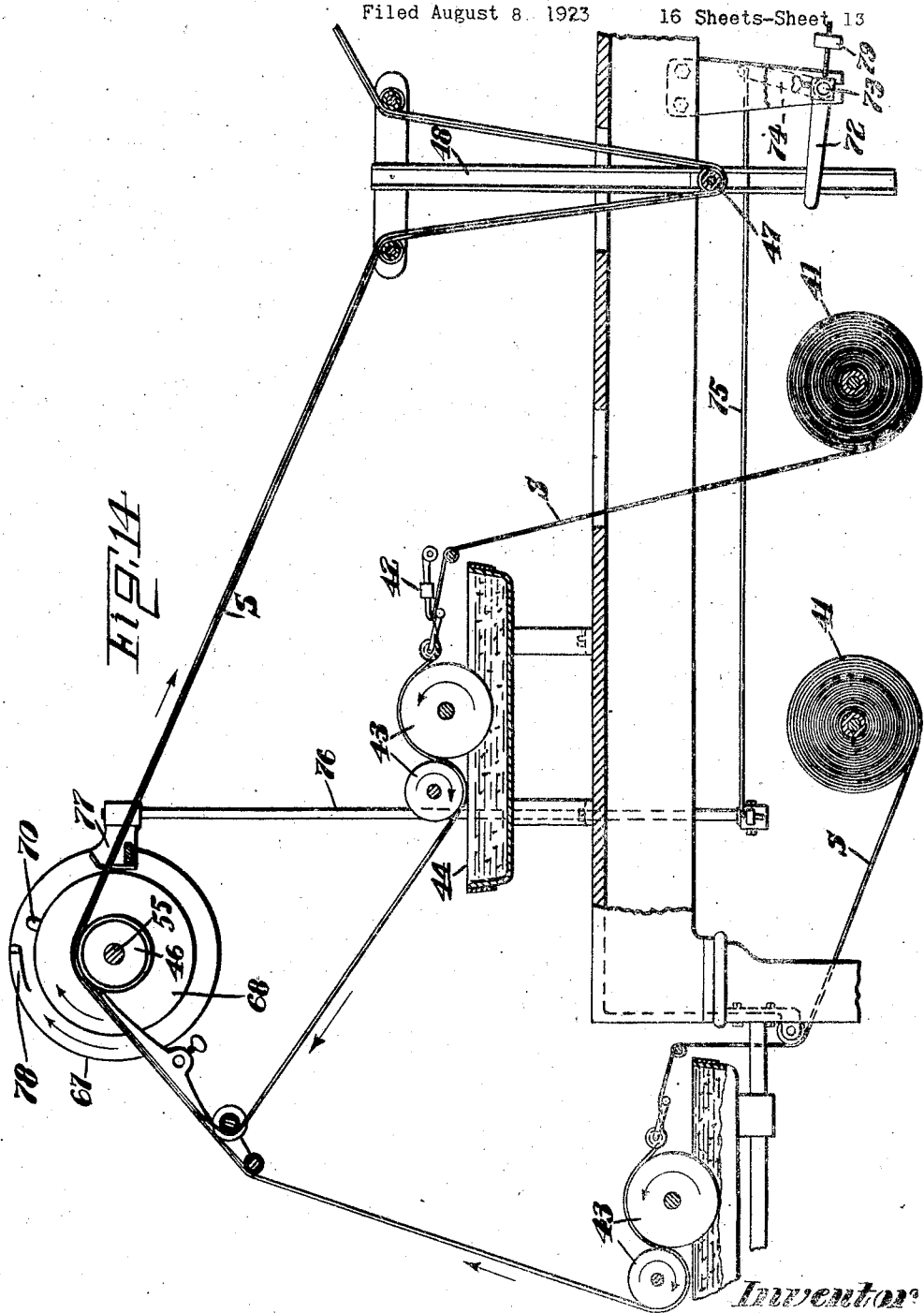

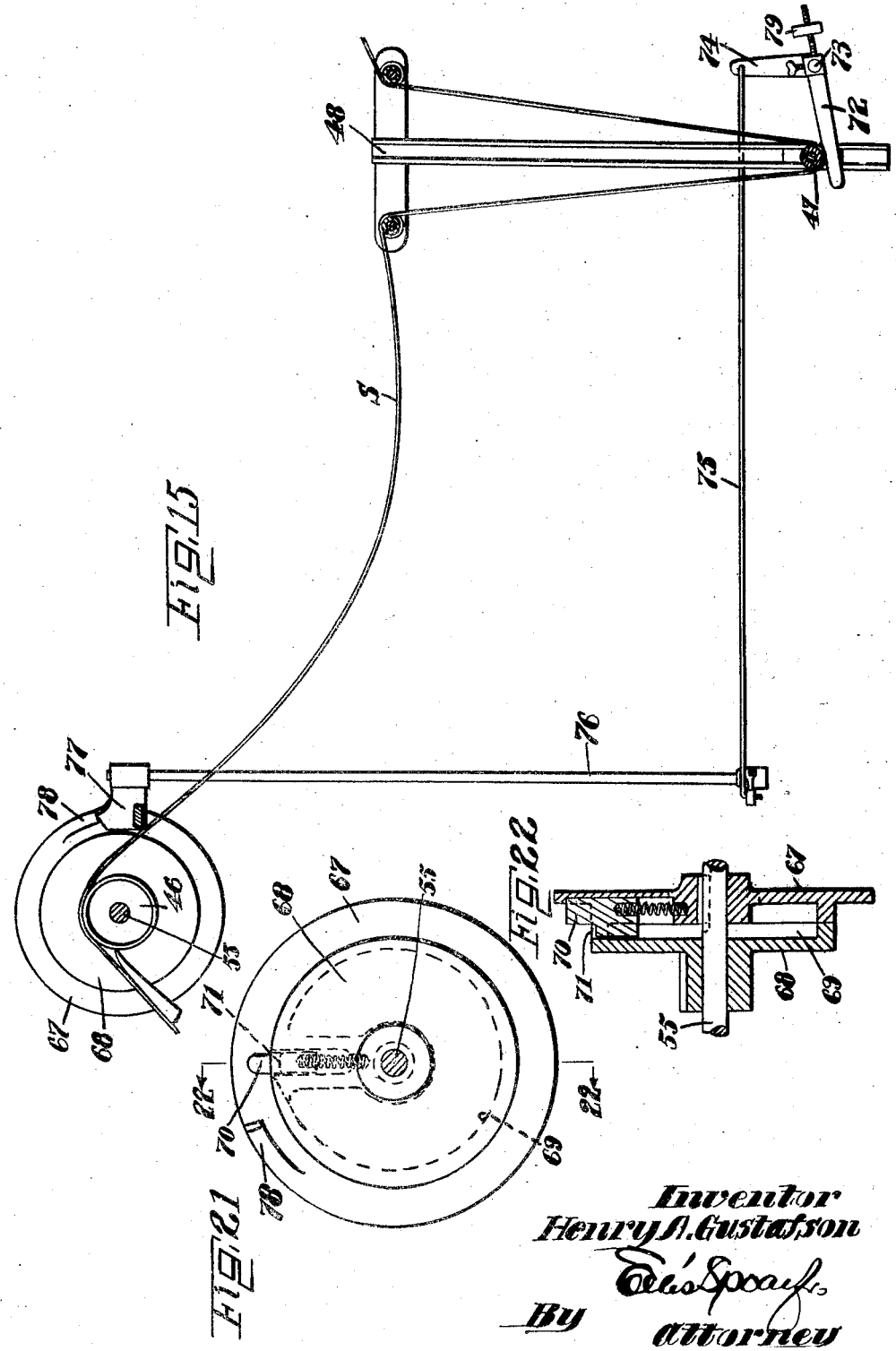

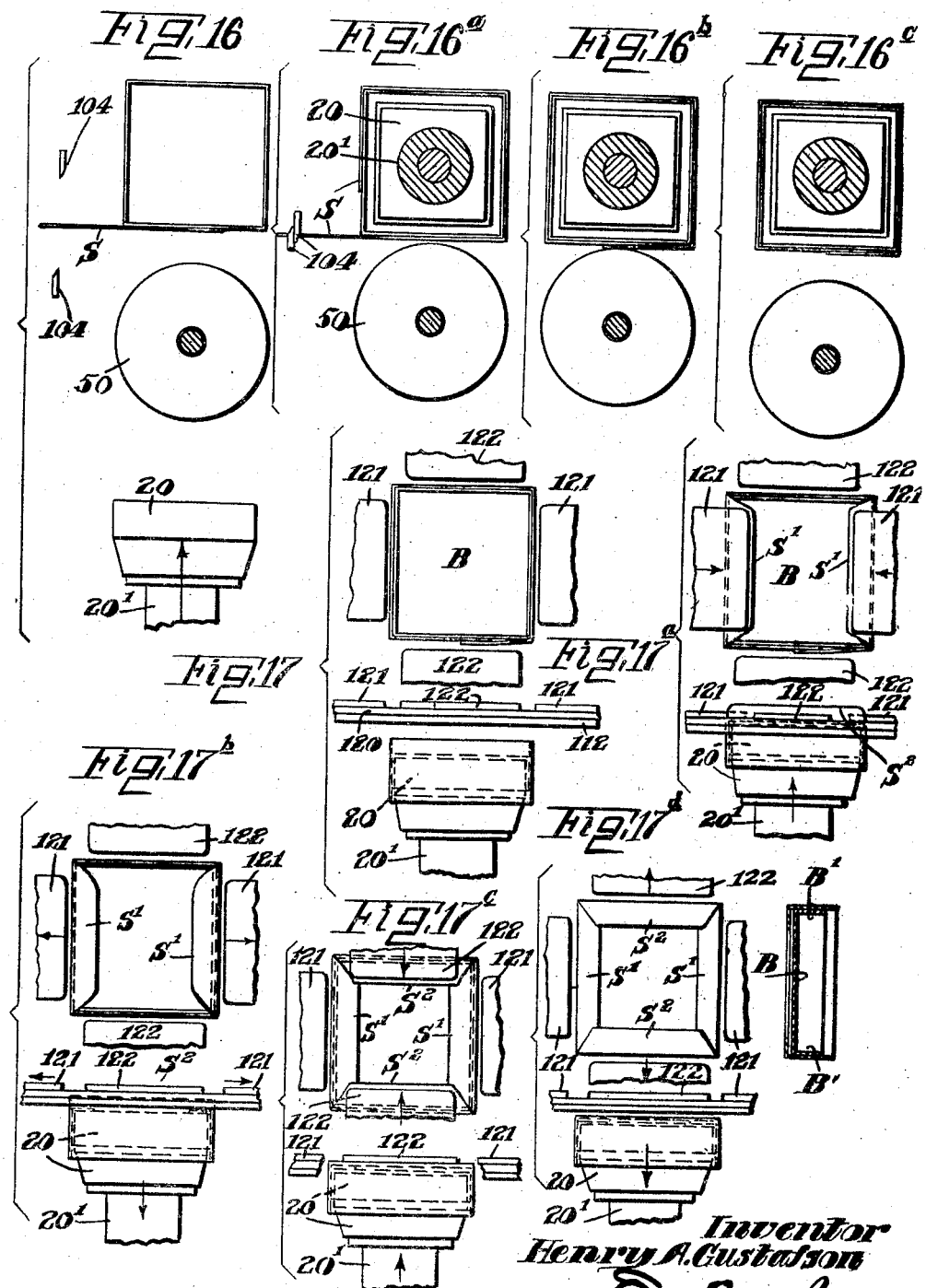

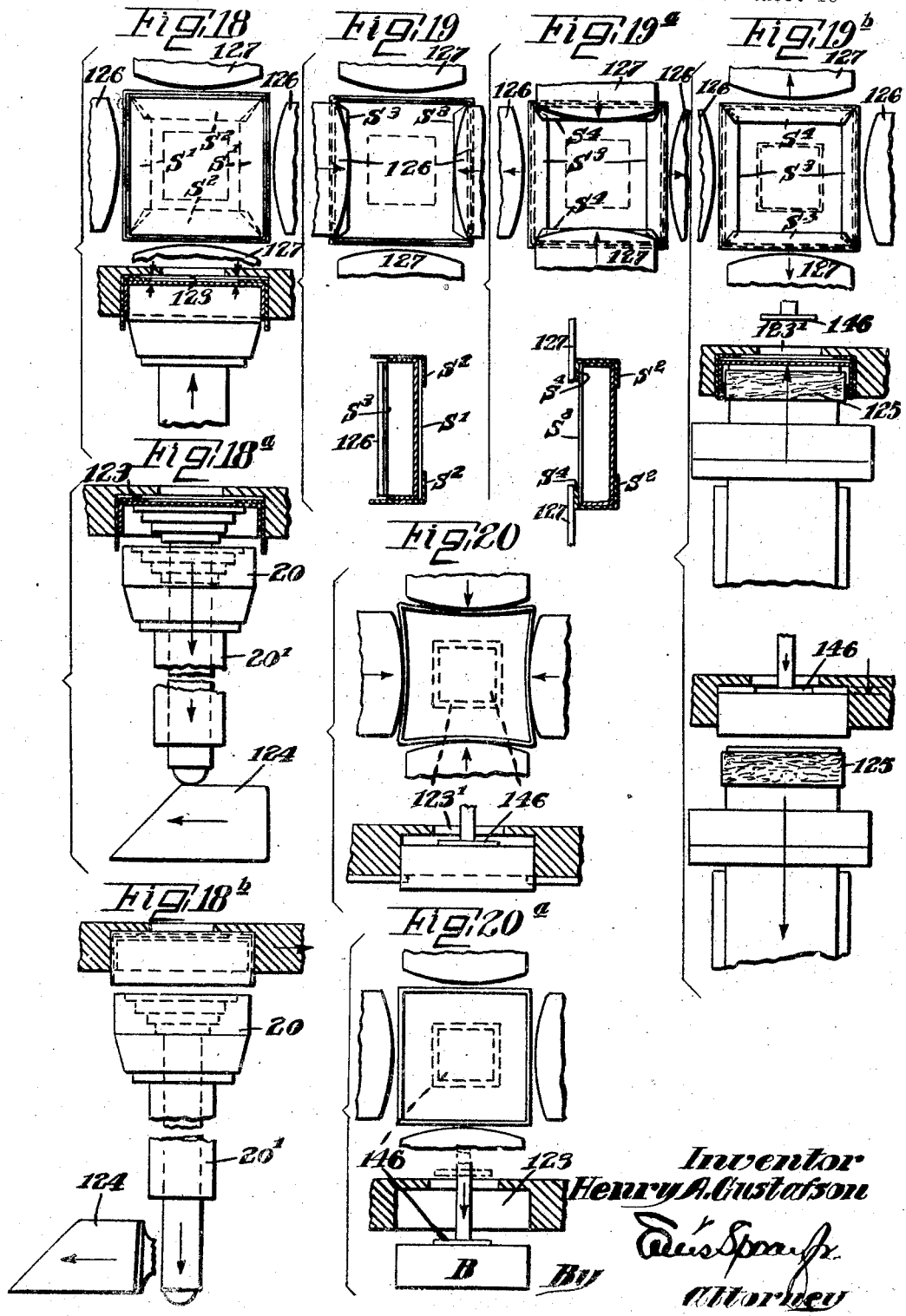

Patented Aug. 31, 1926.

1,597,681

UNITED STATES PATENT OFFICE.

HENRY A. GUSTAFSON, OF DORCHESTER, MASSACHUSETTS, ASSIGNOR TO PNEUMATIC SCALE CORPORATION LIMITED, OF NORFOLK DOWNS, MASSACHUSETTS, A CORPORATION OF MASSACHUSETTS.

MACHINE FOR MAKING PAPER BOXES.

Application filed August 8, 1923. Serial No. 656,374.

This invention relates to machines for making paper boxes, and particularly to a machine of the type disclosed in the patent to Hogfeldt, No. 1,016,266, granted Feb. 6, 1912, to which reference is made as illustrating a machine of the same general character involved herein.

My invention contemplates certain improvements upon and refinements over the machine of the Hogfeldt patent, and consists in the novel construction, combination and relation of parts described and illustrated in the accompanying specification and drawings and particularly pointed out in the appended claims.

One characteristic feature of my invention consists in an automatic safety mechanism controlled by the feed of the box blanks and automatically effective upon failure of such feed to prevent the pressure roll for the banding strip from pressing the strip against the box thereby preventing feed of the strip.

Heretofore, in machines of this type, whenever there was a failure of box blank feed, the presser roll operated and the severed length of adhesively coated banding strip was pressed against and adhered to the box blank holder itself and was wrapped around said holder when the holder began to revolve, necessitating stopping the machine until the strip could be picked off the holder. If the failure of the box blank feed was not immediately noticed and the gummed strip removed from the holder, the physical presence of this strip wrapped about the holder prevented the entrance of succeeding box blanks into the holder, causing the machine to jam. According to my invention, I overcome this defect by the use of a box blank detector disposed in the path of feed of the box blanks for actuation by each blank as it is fed, such actuation removing a normally applied latch for the strip presser roll and permitting said roll to function. Whenever there is a failure of box blank feed, the detector is not actuated and consequently the latching mechanism for the presser roll remains applied so that said roll will not function.

Another feature of my invention consists in an automatic clutch mechanism controlling the feed of the banding strip, whereby the strip feed will be automatically discontinued whenever slack develops in the strip and will be automatically resumed when the slack is taken up.

Heretofore, whenever slack developed in the banding strip, the strip would become entangled and broken unless the operative reduced the speed of the strip feed until the slack was taken up. If then, the operative did not again adjust the speed of the feed, the pull of the box on the strip was apt to break the strip. This necessitated constantly changing the speed of the strip feed. My invention avoids this defect by automatically stopping the strip feed whenever slack develops and will be automatically resumed when the slack is taken up.

A further feature of my invention consists in the shear mechanism which severs from the banding strip a length sufficient to encircle the particular size of box being banded. Heretofore, in machines of this type, one shear blade was stationary and the other moved past it to cut the strip. Such cutting action, however, distorted the strip out of its plane of travel, particularly where the point of action of the blades on the strip was distantly removed from the plane of travel of the strip, as with large-sized boxes. I overcome this objection by arranging both shear blades for simultaneous opposite movement in adjacent parallel planes, with capacity for adjustment for varying sizes of boxes, so that the point of overlap of the blades will always be at the plane of the strip and hence the strip will be severed without distortion from its plane of travel.

These, and certain other features of advantage which will appear more particularly hereinafter, are secured in the machine of the present invention. As illustrative of the principles involved, I shall show and describe a form of machine which has been found satisfactory in actual use and well adapted to the requirements of manufacture. Throughout the accompanying specification and drawings like reference characters are correspondingly applied and in the drawings:

Fig. 1 is a front elevation of a paper box making machine in accordance with my invention.

Fig. 2 is a side elevation of the machine as viewed from the right of Fig. 1.

Fig. 3 is a side elevation as viewed from the left of Fig. 1.

Fig. 4 is a plan view of the machine with super-structure broken away.

Fig. 4ª is a plan view of the banding strip feed.

Fig. 4ᵇ is a plan view of the box blank feed.

Fig. 4ᶜ is a fragmentary plan view of the automatic safety device for preventing operation of the banding strip presser roll whenever there is a failure of box blank feed.

Fig. 4ᵈ is a stripped view showing the operating mechanism for the box blank holder, the strip shears, the front and back folders, and the laterally sliding matrix.

Fig. 5 is an enlarged elevation partly in section, of the machine as viewed in Fig. 2 and particularly showing the shear mechanism.

Fig. 6 is a similar view from the opposite side, as in Fig. 3.

Fig. 7 is a fragmentary section of the box blank feed mechanism, particularly showing the automatic safety mechanism controlled by the feed of the box blanks.

Fig. 7ª is a view similar to Fig. 7 and showing a further position of said parts.

Figs. 8 and 8ª are detail views of the mutilated gear for revolving the box holder to lay the banding tape about the box, Fig. 8 showing the inoperative and Fig. 8ª the operative position of the parts.

Fig. 9 is a view similar to Fig. 7ª and showing the position of the box blank when the parts are in the position of Fig. 8ª.

Figs. 10 and 11 are detail views of the automatic safety device for preventing operation of the strip pressure roll upon failure of the box blank feed, Fig. 10 showing the safety device applied to prevent operation of the presser roll, and Fig. 11 showing it released by the feed of a box blank to permit operation of said roll.

Fig. 12 is a section on the line X—X of Fig. 4 with the box holding form omitted to show the parts which lie behind it.

Figs. 13 and 13ª are enlarged detail views of the front folder slide shown in Fig. 12 and of the folders carried by said slide, Fig. 13, illustrating the folding down of one pair of opposite side folds and Fig. 13ª illustrating the folding down of the other pair of opposite side folds.

Figs. 14 and 15 are fragmentary stripped views particularly showing the gravitating tension device which actuates the automatic clutch mechanism for the banding strip feed whenever a slack condition exists in the strips, Fig. 14 showing the operative and Fig. 15 the inoperative position of said tension device.

Fig. 15ª is a view illustrating the action of the automatic clutch mechanism whenever a slack condition exists in the banding strip.

Figs. 16, 16ª, 16ᵇ and 16ᶜ are diagrams illustrating the severing and laying of the banding strip about the box blank.

Figs. 17, 17ª, 17ᵇ, 17ᶜ and 17ᵈ are diagrams illustrating the folding of the back extensions of the strip about the outside of the box bottom.

Figs. 18, 18ª and 18ᵇ are diagrams illustrating the setting of the back extensions of the strip, which have been folded as illustrated in Fig. 17, firmly against the bottom of the box and also showing the release of the box from the box holding plunger to permit the laterally sliding matrix to set over the box transversely into line with the front fold setting plunger.

Figs. 19, 19ª and 19ᵇ are diagrams illustrating the folding down of the front extensions of the strip, Fig. 19ᵇ also illustrating the partial ejection of the blank from the matrix to permit the side walls of the box to be set.

Figs. 20 and 20ª illustrate such setting of the box walls, Fig. 20ª also illustrating the ejection of the completed box from the matrix and Figs. 21 and 22 are detail views of the clutch forming a part of the banding strip safety feed mechanism, Fig. 22 being a section on the line 22—22 of Fig. 21.

*General.*

In a machine of the type shown herein the box blanks are of rectangular form and are stacked edgewise in a magazine from which they are ejected singly and passed to a box holder where their notched flaps are turned inwardly to form the four sides of the box, the main body portion of the blank forming the bottom of the box. One or more lengths of banding strip is then laid around the corners of the box in a complete turn, the box being rotated relative to the strip until the banding has been substantially completely wound around the box after which it is severed from the strip, and the box holder is then advanced axially towards a folder which folds the back or outer extensions of the strip against the bottom face of the box.

The box holder is thereupon again advanced axially to a laterally sliding matrix within which the box is stripped from the holder and set over laterally into line with a fold setting plunger and during such set over the inside or front extensions of the banding strip are turned over at right angles to the flaps of the box. When the box reaches alinement with the fold setting plunger said folds are sealed down to the inside faces of the box flaps. The box is then compressed to set it to shape and afterwards ejected from the machine.

Blank box magazine.

The properly shaped and scored box blanks B are stacked edgewise in a magazine 1 (Fig. 4$^b$) slidable on the table 2 of the head of the machine. The magazine is advanced a uniform distance linearly, by any suitable feed mechanism, as the box blanks are singly removed therefrom. As here shown, the magazine is advanced progressively by a tension feed mechanism comprising a pair of chains 3 anchored at 4 to the table 2 and passing over the sprockets 5 mounted upon a sprocket shaft at the forward end of the magazine. From said sprockets, the chains are extended rearwardly above the magazine past guide sprockets 6 at the rear end of said table, being weighted at their free ends, as indicated at 7, Fig. 2. The magazine is adapted to be latched in its rearward position by a spring-tensioned latch 8, (Fig. 4$^b$).

Box blank feed mechanism.

As the foremost blank in the stack of blanks contained in the magazine 1 is projected beyond the forward edge of the table 2, it is engaged by a vertically reciprocable feed plunger 9, Figs. 7 and 7$^a$, and carried downwardly past opposite pairs of spaced feed rolls 10 into a holder 11 disposed in line with the plunger and carried by a bracket 12. The blank feed rolls 10 are rotated in opposite directions from a drive shaft 13, (Fig. 4$^c$) which is driven by a sprocket and chain 14 from the power shaft 15 of the machine, Fig. 3. The drive shaft 13 is geared at 16 to the front roll shaft 17 and said shaft is geared at 18 to the rear roll shaft 19 whereby the pairs of rolls 10 are rotated in unison, (Fig. 4$^c$).

Through a gear train 22 the power shaft 15 drives a cam shaft 23 at the back of the machine and a cam shaft 24 at the front of the machine (Fig. 4$^d$). Fast to the cam shaft 23 is an eccentric 25 which is connected by a rod 26 with a bell crank lever 27 (Fig. 7$^a$). The lever 27 is connected by a rod 28 with a toggle lever 29 and said lever 29 is connected by a link 30 with the slide 9 which feeds the box blanks from the magazine 1 to the box holder 11.

The holder 11 is apertured to permit a longitudinally disposed plunger 20 to slide therethrough and at one side of said aperture is provided with a plurality of horizontally disposed spring fingers 21 by means of which the flaps B′ forming the walls of the box are turned up on advance of said plunger.

Box holding plunger.

The plunger 20 is both rotatable and axially slidable relative to the holder 11, being mounted within a sleeve 20′. Splined at 31 to said sleeve is a pinion 32 (Figs. 7$^a$ and 8$^a$) adapted to mesh with a mutilated gear 33 on the cam shaft 23. The gear 33 is provided beyond its toothed portion and adjacent its periphery with a pin 34. Splined to the plunger sleeve 20′ is a disc 35, the periphery of which is segmentally recessed as indicated at 36, Figs. 3, 8 and 8$^a$, to permit the smooth portion of the constantly revolving mutilated gear 33 to pass said disc without revolving it.

Fast to said disc at one side thereof, is a dog 37 adapted to be contacted by the pin 34 on the mutilated gear 33 at the proper moment. Such contact raises the dog, as shown in Fig. 8$^a$, revolving the disc counter clockwise sufficiently to insure accurate meshing of the pinion 32 which is fast on the opposite face of the disc, with the toothed portion of the mutilated gear. The plunger 20 will now be rotated through a complete revolution whereby the banding tape will be laid around the box in a complete turn.

The plunger 20 is advanced axially by a cam 37 on the cam shaft 23. This cam is a closed cam and has a cam path generated therein to control the advance, pause, and retreat of the plunger. The actuation of the cam 37 is transmitted to the plunger by a cam lever 38 having a cam roll 39 operating in the cam path. The upper end of the cam lever is connected to the plunger in any suitable manner, as indicated at 40, Fig. 7$^a$.

Banding strip feed.

The banding strip S is carried upon a supply roll 41 depending from the frame of the machine. As shown in Fig. 14, two supply rolls 41 are provided so that differently colored strips, or a linen and a paper strip, for example, may be simultaneously fed. For convenience of description, however, it will be assumed that only one strip roll is in operation.

The strip is drawn by a feed pulley 46 from the supply roll 41 through a tension device 42 past a pair of glue rolls 43 operating in a glue pan 44 and through a second tension device 45. From the pulley 46, the strip is passed around a gravity roll 47 which operates in guideways 48 and is adapted to cause the feed of the strip to be discontinued whenever slack develops, as indicated diagrammatically in Fig. 15$^a$.

From the gravity roll 47 the strip is passed through a tension device 49 (Fig. 1) to a reciprocable presser roll 50 which lays the strip against the box in the holder 11.

In its passage through the tension device 49, the strip is positively fed forward by means of a feed finger 51 which is rocked at each cycle of the machine by a cam 52 mounted on the cam shaft 24 (Fig. 2) and connected by a cam lever 53 and rod 54 with said feed finger.

The banding strip feed pulley 46 is fast on a shaft 55 which is constantly driven by a sprocket 56 thereon, a chain 57, and a sprocket 58 on a counter shaft 59 (Fig. 4a). The shaft 59 is driven by a variable speed drive consisting of a friction disc 60 on said shaft and a friction cone 61 adjustable by a feed mechanism 62 radially of said disc. The cone 61 is mounted on a shaft 63 which is geared at 64 to a cross shaft 65 driven by a sprocket and chain drive 66 (Fig. 4) from the cam shaft 24.

*Automatic clutch mechanism for the strip feed.*

The feed of the banding strip is automatically disconnected whenever slack develops in the strip and automatically resumed whenever the slack is taken up. To this end, I provide an automatic clutch mechanism operated from the gravity roll 47, (Figs. 21 and 22) and comprising loose and fast clutch members 67 and 68, respectively, on the pulley shaft 55.

The inner face of the fast clutch member 68 has an eccentric shoulder 69 formed annularly thereabout, and the loose clutch member 67 carries on its inner face a spring-backed dog 70 which is provided with a shoulder 71.

Normally, when the banding strip is taut, as in Fig. 14, the shoulder 71 rides on the shoulder 69, and the clutch member 67 drives the pulley shaft 55. When slack develops in the strip, however, the gravity roll 47 will contact a pair of levers 72 fulcrumed on a horizontal rock shaft 73 and rock said shaft, as shown in Fig. 15, and the rocking motion of said shaft is transmitted through an arm 74 fast on said shaft 73 and connected by a rod 75 with a vertical rock shaft 76 to a stop arm 77 on the upper end of the shaft 76. Upon actuation of the levers 72, therefore, the stop arm 77 will be rocked into the path of the clutch dog 70 of the clutch member 67 and the contact of said arm and dog will force the dog downwardly, against the tension of its backing spring, whereby to carry the shoulder 71 off the shoulder 69 thereby disconnecting the clutch parts 67 and 68. Further rotation of the clutch member 68 is prevented by the contact of a stop lug 78 on the face of the clutch member 68 with the stop arm 77.

The feed of the banding strip is therefore discontinued until the slack is taken up, at which time the gravity roll 47 will be lifted, by the banding strip, away from the levers 72, permitting a counterweight 79 associated with said levers to return the parts to their normal position shown in Fig. 14.

*Presser roll safety mechanism.*

The presser roll 50 is pivoted to swing towards and away from the box holder 11 whereby to press the banding tops against the box edges as the box and holder are rotated therepast. For this purpose, the roll 50 is journaled on an arm 80 which is fulcrumed between its ends on a rock shaft 81 and at its rear end is spring tensioned as indicated at 82 (Fig. 12). The rock shaft 81 has an arm 83 depending therefrom and connected by a latch bar 97 to a cam lever 84 operated from a cam 85 on the cam shaft 24 whereby, in the normal operation of the machine, the presser roll is raised towards the box holder at each cycle of the machine. In such operation, each box blank as it is fed between the rolls 10 encounters a detector finger 86 pivoted on a rock shaft 87 and under the control of a spring 88 so that the detector finger will normaly lie in the path of the box blanks feeding between said rolls, (Fig. 10).

Each box blank as it is fed between the rolls 10 swings the detector finger into the position of Fig. 11, and such movement of the finger is utilized to remove a latch mechanism for the strip presser roll 50 whereby to permit said roll to function. To this end, the rock shaft 87 of the detector finger is provided with an arm 89 which is linked at 90 to a bell crank lever 91 and the bell crank lever 91 is linked at 92 to a rocker lever 93 which is fulcrumed between its ends (Figs. 10 and 11) on a rock shaft 94. Fast on the rock shaft 94 is a latch dog 95 adapted when the parts are in the position of Fig. 10, to lie under and in contact with the lug 96 on the under face of the latch bar 97, which is connected by the rocker arm 83 with the rock shaft 81 for the presser roll.

When the detector finger is actuated by a descending box blank, as shown in Fig. 11, the latch dog 95 is removed from beneath the lug 96 on the latch bar 97, permitting the cam lever 84 to raise the presser roll.

The operation of the lever 84 is subject to a pawl and ratchet locking mechanism comprising a ratchet arm 98 carried by the rock shaft 81 and a spring tensioned pawl 99 pivoted at 100. Normally the pawl and ratchet are in engagement to prevent operation of the presser roll, but this engagement is released at the proper moment by a pin 101 on one of the castings in which the rock shaft 81 is journaled and adapted to contact the pawl to carry it away from the ratchet teeth, whereby the lever 80 may be swung upwardly. After the box blank has passed through the feed rolls 10, the detector finger is returned to its normal position, shown in Fig. 10, by a cam 102 on the cam shaft 23. This cam actuates a spring tensioned plunger 103 which bears at its lower end upon the free end of the rocker arm 93.

*Strip severing mechanism.*

After the presser roll 50 has been rocked upwardly to carry the banding strip against the box in the box holder 11 and the holder has turned through approximately three quarters of a revolution, a pair of shears 104, Fig. 5, is actuated to sever from the strip a length sufficient to entirely encircle the box. The shears 104 work in opposition to each other and are mounted upon a pair of adjacent racks 105 which are reciprocated in opposite directions from the cam shaft 24 (Figs. 4, 5 and 12) by a gear segment 106 mounted on said cam shaft and meshing with a gear 107 mounted on a countershaft 108. Fast on said shaft 108 is a pair of spaced pinions 109 and 110. The pinion 109 meshes directly with the rack teeth of the upper shear bar. The pinion 110 through a gear train 111, drives the rack for the lower shear, the relation being such that the two shears do not operate until the box holder 11 has made substantially three fourths of a revolution, (Figs. 16, 16ª). After the shears have operated, the box holder completes its revolution, as shown in Fig. 16ᵇ, the presser roll being still in its raised position. The strip is now laid completely around the box, whereupon the presser roll retreats from the box, as shown in Figs. 6 and 16ᶜ. The plunger 20 then advances (Fig. 17ª) to carry the box with the strip wound thereon to a back folding device 112, Figs. 5 and 12, which is adapted to fold the projecting edges S' of the strip over the bottom of the box. (Figs. 17ª, 17ᵇ, 17ᶜ and 17ᵈ).

*Back folding mechanism.*

The back folder 112 consists of an oscillatable ring having four equidistantly spaced cam slots 113 adjacent its periphery. This ring is oscillated from a cam 114 on the cam shaft 23 by means of a cam roll 115 carried by a cam lever 116 fulcrumed on said shaft (Fig. 4ᵈ). The opposite end of the cam lever 116 is linked at 117 to a rocker lever 118 which is fulcrumed at 119' and fastened at 119 to a lug projecting from the periphery of the oscillatable ring 112.

Mounted in rear of said ring is a stationary ring 120 (Fig. 5) having at spaced equidistant points four slideways for the reception of opposite pairs of back folder slides 121 and 122. The slide pairs work in alternation to each other and are provided with cam rolls 122' disposed in the cam slots of the oscillatable ring. When the cam ring is first swung to the right in Fig. 12, the pair of horizontal slides 121 operate to turn down two opposite extensions S' of the strip against the bottom of the box (Fig. 17ª). The plunger 20 now retreats (Fig. 17ᵇ) due to the dwell in its actuating cam, and the oscillatable ring 112 returns to its original position whereby to retract the folder pair 121. The oscillatable ring 112 continues its movement in the reverse direction, that is to the left in Fig. 12, to cause the other pair of folders 122 to operate (Fig. 17ᶜ) and turn down the other pair of extensions S² of the strip, whereupon the plunger 20 again retreats (Fig. 17ᵈ) and the oscillatable ring swings back to its original position returning the folder pair 122 to its original position. The back extensions S' and S² of the strip are now folded against the bottom of the box, but the front extensions S³ and S⁴ have not yet been folded against the inside faces of the box flaps. The plunger 20 is therefore again advanced and this time passes through the back folder 112 to carry the box into a matrix 123, which sets the back extensions S' and S² firmly against the bottom of the box. (See Fig. 18).

*Box stripping mechanism.*

The box is now stripped from the plunger head by this matrix (Fig. 18ª) and the plunger is retracted (Fig. 18ᵇ) to assume position to advance a new box blank to the matrix.

This is accomplished as follows: Fast on the cam shaft 24 is a beveled arm 124 which when the plunger 20 is at the extreme limit of its forward travel, as shown in Fig. 18ª, has been moved into engagement with the rounded rear end of said plunger. At this moment the sleeve 20' for the plunger 20 has commenced its rearward movement, but the plunger itself is prevented from rearward movement by the beveled arm 124 which is still in contact with the outer end thereof, (Fig. 18ª). The plunger head at the forward end of the plunger itself is therefore still held in contact with the inner face of the box bottom whereby to press the box firmly into the matrix. When the beveled arm 124 passes off the rear end of the plunger 20, the plunger is free to retreat to its full limit of rearward travel under the action of a compression spring contained within said sleeve, and the box will be left in the matrix box 123.

The matrix is now moved laterally a distance sufficient to bring it in line with a front fold setting plunger 125 which operates after the unfolded front edges of the strip have been folded over at right angles to the box flaps, for subsequent sealing down to the inner faces of said box flaps.

The mechanism for imparting sliding travel to the matrix 123 consists of a cam 200, (Figs. 3 and 4ᵈ) on the cam shaft 23, a cam lever 201 fulcrumed between its ends and having at its upper end a cam roll 202 cooperating with said cam and linked at its lower end at 203 to a rocker arm 204 fast on a rock shaft 205, said shaft having another rocker arm 206 which is linked at 207 to the sliding matrix.

Front folding mechanism.

The front extensions S³ and S⁴ of the strip are folded down over the box flaps during this lateral travel of the sliding matrix 123 by a series of four equi-distantly spaced spring-tensioned folder slides 126 and 127 which operate in pairs in alternation to each other. The horizontally disposed folder pair 126 is actuated from a stationary cam piece 128 (Figure 13) by a cam lever 129 which is fulcrumed at 130 and carries at one end a cam roll 131 adapted to ride upon said cam piece. One arm of the cam lever 129 bears against one slide of the folder pair 126. Said lever 129 is spring-controlled, as indicated at 132, and has an arm 133 which is swiveled at 134 in the oppositely disposed arm 135 of a rocker lever 136. The lever 136 is fulcrumed at 137 and spring-tensioned, as indicated at 138, and at one arm thereof bears against the opposite slide of the folder pair 126 whereby both slides work in unison to turn down the extensions S³ (Fig. 19) of the strip.

After the slide pair 126 has operated, the actuating levers 129 and 136 open, due to the fact that the cam roll 131 has ridden off the cam piece 128, as shown in dotted lines in Fig. 13, permitting the tension springs 132 and 138 to retract the levers, and the opposite slide pair 127 are advanced towards each other to fold over the extensions S⁴ of the strip in the continued lateral travel of the matrix 123 (see Fig. 13ᵃ).

To accomplish this, I provide a stationary cam piece 139 and a spring tensioned cam-lever 140 which cooperates with a spring-tensioned rocker lever 141 similar to the rocker lever 136, whereby to actuate said slide pair 127 in unison (Fig. 19ᵃ). The levers 140 and 141 open as the cam roll rides off the cam piece 139 to permit the slide pair 127 to retreat.

The continued set over of the sliding matrix 123 brings the matrix into line with an opening 142 in the slideway for the matrix. All flaps of the tape are now turned over, but the front flaps have not yet been sealed to the inner faces of the box flaps.

Front fold setting plunger.

The front fold setting plunger 125 now advances to seal down the extensions S³ and S⁴ to the inner faces of the box flaps (Fig. 19ᵇ). This plunger is provided with an elastic head and is reciprocated from a cam 143 on the cam shaft 23. The cam 143 actuates a cam roll 144 (Fig. 4) fast to an arm carried by the plunger whereby to advance the plunger against the action of a pair of coil springs 145 which are adapted to retract the plunger after it has been advanced.

Box setting mechanism.

After the plunger 125 has been retracted, the box is moved a slight distance out of the matrix 123 in order to bring the side walls B' of the box into the path of the front folder slides 126 and 127 so that these slides may set in the sides of the box slightly as shown in Figs. 12 and 20. The mechanism for partially projecting the box out of the matrix consists of an ejector 146 operating through the opening 142 of the matrix slideway, the matrix 123 itself having an opening 123' adapted to aline with said ejector at this phase of the operation.

The ejector 146 is operated by a cam 147 on the cam shaft 24 and a cam lever 148 (Figs. 2 and 5) which is fulcrumed between its ends and at its upper end carries a cam roll 149 operating in the path of said cam 147. The lower end of the cam lever 148 is connected by a rod 150 with the arm 151 of a rock shaft 152. Fast on said shaft is another rocker arm 153 which is connected at its upper end at 154 to the ejector 146 which, upon actuation, engages the bottom of the box and projects it slightly beyond the edge of the matrix, as shown in Fig. 19ᵇ.

The front folder slides 126 and 127 are now all simultaneously actuated to advance them against the walls of the box to slightly set in said walls, as shown in Figs. 12 and 20. The mechanism for actuating these slides consists of a cam 155 on the cam shaft 23, a cam lever 156 having a cam roll cooperating with said cam 155, a rock shaft 157 to which said cam lever 156 is fast at one end, and an arm 158 fast on the opposite end of said rock shaft 157 (see Figs. 3 and 6). The arm 158 is linked at 159 to the lower end of a vertically disposed lift rod 160 which works against the compression of a spring 161. Between its ends the rod 160 is provided with an adjustably mounted block 162, one end of which lies beneath a pin 163 on a horizontally projecting arm 135' carried by the rocker lever 135. At its upper end the rod 160 is provided with a similar block 165 disposed to actuate an arm 140' projecting from the rocker lever 140. Both levers 135 and 140 are therefore operated simultaneously to advance all of the front folder slides towards the center to thereby set in slightly the walls of the box.

After the rod 160 has been raised, the cam roll of lever 156 enters a dwell in the path of cam 155 and the spring 161 returns the rod and levers to their former position, permitting the front folder slides to retreat. After said slides have retreated, the ejector 146 continues to advance to carry the box completely out of the matrix, as shown in Fig. 20ª, and then retreats in the continued rotation of its actuating cam 147. After the ejection of the box from the matrix 123, the matrix is returned to its original position during the continued rotation of its actuating cam. The box is now completely banded and falls onto a gravity chute 165 by which it is carried from the machine.

Various modifications in the construction, combination and relation of parts may obviously be resorted to within the limits of the appended claims.

What I therefore claim and desire to secure by Letters Patent is:

1. In combination, a feeder for an unbanded box, a banding strip feeder, a strip presser, and means for permitting operation of the strip presser when the feed of the boxes is normal and preventing operation of said presser when the box feed fails.

2. In combination, a box blank feeder, a banding strip feeder, and a strip presser, and means for permitting operation of the strip presser when the feed of the box blanks is normal and for preventing operation of said presser when the box blank feed fails.

3. In combination, a box blank feeder, a banding strip feeder, and a strip presser, and means controlled by the feed of the box blanks for permitting operation of the strip presser when the feed of the box blanks is normal and for preventing operation of said presser when the box blank feed fails.

4. In combination, a box blank feeder, a banding strip feeder, and a strip presser for pressing the strip against the box blanks, and a box blank detector disposed in the path of feed of the box blanks for actuation by each blank as it is fed and effective upon a failure of the box blank feed to prevent operation of said presser.

5. In combination, a box blank feeder, a banding strip feeder, and a strip presser for pressing the strip against the box blanks, and a box blank detector disposed in the path of feed of the box blanks for actuation by each blank as it is fed and effective upon actuation to permit said strip presser to operate and automatically effective upon a failure of the box blank feed to prevent operation of said presser.

6. In combination, a box blank feeder, a banding strip feed, a strip presser effective to press the strip against the box blank, a normally-applied latch mechanism for said presser, and a box blank detector disposed in the path of feed of the box blanks for actuation by each blank as it is fed and effective upon such actuation to remove said latch and permit said presser to function and ineffective upon said latch upon a failure of the box blank feed whereby the presser is prevented from operating.

7. In combination, a box blank feeder, a banding strip feeder, a strip severing mechanism, a strip presser effective to press the severed strip against the box blank, a normally-applied latch mechanism for said presser, and a box blank detector disposed in the path of feed of the box blanks for actuation by each blank as it is fed and effective upon such actuation to remove said latch and permit said presser to function and ineffective upon said latch upon a failure of the box blank feed whereby the presser is prevented from operating.

8. In combination, a box blank feeder, a banding strip feeder, a box blank holder adapted to receive the box blanks, a strip presser mounted for movement relative to said box holder for pressing the strip against a box blank in said holder, a cam shaft, a cam thereon, operative connections between said cam and said presser including a movable latch bar operating at each throw of the cam, a latch normally engaged with said latch bar, a box blank detector normally disposed in the path of feed of the box blanks for actuation by each blank, operative connections between said detector and said latch for withdrawing the latch from engagement with the latch bar upon actuation of the detector whereby to permit the presser to function and ineffective upon said latch upon a failure of box blank feed whereby to prevent the presser from functioning, and means effective after each actuation of the detector for automatically returning the detector to original position.

9. In combination, a box blank feeder, a banding strip feeder, and a box blank holder adapted to receive the box blanks, a strip presser roll mounted for pivotal movement relative to said box holder for pressing the strip against a box blank in said holder, a cam shaft, a cam thereon, operative connections between said cam and said presser roll including a movable latch bar operating at each throw of the cam, a latch normally engaged with said latch bar, a box blank detector normally disposed in the path of feed of the box blanks for actuation by each blank, and operative connections between said detector and said latch for withdrawing the latch from engagement with the latch bar upon actuation of the detector whereby to permit the presser roll to function and ineffective upon said latch upon a failure of box blank feed whereby to prevent the presser roll from functioning.

10. In combination, a box blank feeder, a banding strip feeder, and a box blank holder adapted to receive the box blanks, a strip presser roll mounted for pivotal movement relative to said box holder for pressing the strip against a box blank in said holder, a cam shaft, a cam thereon, operative connections between said cam and said presser roll including a movable latch bar operating at each throw of the cam, a latch normally engaged with said latch bar, a box blank detector normally disposed in the path of feed of the box blanks for actuation by each blank, and operative connections between said detector and said latch for withdrawing the latch from engagement with the latch bar upon actuation of the detector whereby to permit the presser roll to function and ineffective upon said latch upon a failure of box blank feed whereby to prevent the presser roll from functioning, and a second cam on the cam shaft and a spring-tensioned plunger operated thereby and effective upon a part of the operative connections between said box blank detector and said latch for returning the detector to original position after each actuation thereof.

11. In combination, a box blank feeder, a banding strip feeder, a box blank holder adapted to receive the box blanks, a strip presser mounted for pivotal movement relative to said box holder and effective to press the strip against a box blank in said holder, a rock shaft carrying said presser, a cam shaft, a cam thereon, operative connections between said cam and said rock shaft including a movable latch bar operating at each throw of the cam, a latch dog normally engaged with said latch bar, a box blank detector normally disposed in the path of feed of the box blanks for actuation by each blank, and operative connections between said detector and said latch dog for withdrawing the latch dog from engagement with the latch bar upon actuation of the detector whereby to permit the presser roll to function and ineffective upon said latch upon a failure of box blank feed whereby to prevent the presser roll from functioning.

12. In combination, a box blank feeder, a banding strip feeder, a box blank holder adapted to receive the box blanks, a strip severing mechanism, a strip presser roll mounted for pivotal movement relative to said box holder and effective to press the severed strip against a box blank in said holder, a rock shaft carrying said presser roll, a cam shaft, a cam thereon, operative connections between said cam and said rock shaft including a movable latch bar operating at each throw of the cam and having a lug, a latch dog normally engaged with said lug of the latch bar, a box blank detector finger pivoted to normally extend across the path of feed of the box blank for actuation by each blank, and operative connections between said detector and said latch dog comprising a system of levers and links for withdrawing the latch dog from engagement with the lug of the latch bar upon actuation of the detector whereby to permit the presser roll to function and ineffective upon said latch upon a failure of box blank feed whereby to prevent the presser roll from functioning.

In testimony whereof I affix my signature.

HENRY A. GUSTAFSON.